(12) United States Patent
Liang

(10) Patent No.: US 7,976,278 B1
(45) Date of Patent: Jul. 12, 2011

(54) TURBINE BLADE WITH MULTIPLE IMPINGEMENT LEADING EDGE COOLING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 871 days.

(21) Appl. No.: 12/004,962

(22) Filed: Dec. 21, 2007

(51) Int. Cl.
*F01D 5/08* (2006.01)
(52) U.S. Cl. ...................................... 416/97 R
(58) Field of Classification Search ................ 416/96 R, 416/97 R
See application file for complete search history.

(56) References Cited

U.S. PATENT DOCUMENTS

| | | | | |
|---|---|---|---|---|
| 4,257,737 A | * | 3/1981 | Andress et al. | 416/97 R |
| 4,738,587 A | * | 4/1988 | Kildea | 416/96 R |
| 5,271,715 A | * | 12/1993 | Zelesky et al. | 416/97 R |
| 5,387,085 A | * | 2/1995 | Thomas et al. | 416/97 R |
| 5,462,405 A | * | 10/1995 | Hoff et al. | 416/97 R |
| 7,137,779 B2 | * | 11/2006 | Liang | 416/1 |

* cited by examiner

*Primary Examiner* — Nathaniel Wiehe
(74) *Attorney, Agent, or Firm* — John Ryznic

(57) ABSTRACT

A turbine blade with a leading edge cooling circuit formed from a series of impingement cavities spaced along the leading edge and separated from the serpentine flow cooling circuit in the remaining sections of the airfoil in order to provide for a low cooling flow along the leading edge. The multiple impingement cavities are separated by a slanted rib on the bottom of the cavity, and each slanted rib includes an impingement hole directed to discharge impinging cooling air to the backside wall of the leading edge. Cooling air flows through the series of impingement cavities and into the last impingement cavity formed at the blade tip. The cooling air then is discharged through tip exit cooling holes. The blade with the multiple impingement cavities formed along the leading edge region can be cast using the prior art casting techniques.

12 Claims, 4 Drawing Sheets

View B-B

TURBINE BLADE WITH MULTIPLE IMPINGEMENT LEADING EDGE COOLING

FEDERAL RESEARCH STATEMENT

None.

CROSS-REFERENCE TO RELATED APPLICATIONS

None.

BACKGROUND OF THE INVENTION

1. Field of the Invention

The present invention relates generally to a gas turbine engine, and more specifically to an air cooled turbine blade with leading edge cooling.

2. Description of the Related Art including information disclosed under 37 CFR 1.97 and 1.98

In a gas turbine engine, compressed air from a compressor is burned with a fuel in a combustor to produce a hot gas flow that is then passed through a turbine to produce mechanical energy by rotating the rotor shaft. In an aero engine, the rotor shaft drives the compressor and a bypass fan to power the aircraft. In an industrial gas turbine (IGT) engine, the rotor shaft drives an electric generator to produce electrical energy.

The efficiency of the engine can be increased by passing a higher temperature gas flow into the turbine. However, the highest temperature for which the turbine can be operated is dependent upon the material characteristics of the turbine parts, especially the first stage rotor blades and stator vanes or guides. These parts are exposed to the highest temperature flow from the combustor.

To allow for higher temperatures beyond the material properties of the turbine blades and vanes, these airfoils make use of complex internal cooling circuitry that provides a combination of convection cooling as well as impingement and film cooling of the inner airfoil surfaces and the outer airfoil surface. Modern airfoil cooling circuitry can allow for the operation of an airfoil under a temperature that exceeds the material melting temperature.

Cooling air for use in the airfoils is compressed air bled off from the compressor, and therefore the work used in compressing the cooling air for the airfoils is lost energy. Thus, the efficiency of the engine can also be increased by using less compressed air to cool the airfoils. The airfoil designer typically tries to maximize the cooling capability of the cooling air while also minimizing the amount of cooling air used in order to produce the highest level of efficiency increase.

The leading edge of the airfoil is exposed to the hottest gas flow temperature because this region of the airfoil it hit head on. In the turbine blades and stator vanes of the prior art (as seen in FIGS. 1 and 2), the airfoil leading edge is cooled by backside impingement cooling air. Pressurized cooling air is supplied to the leading edge cooling channel 11 and flows upward toward the blade tip and around the turn and through the remaining passages that form the 3-pass serpentine flow cooling circuit. Some of the cooling air in the leading edge supply channel is bled off through rows of impingement holes 12 in the rib and impinged onto the backside surface of the leading edge wall. The impingement cooling air then flows up and out from the leading edge impingement channel 14 (that extends along the entire airfoil surface n the spanwise direction) through a tip cooling hole 13.

However, for an airfoil with a low cooling flow design, especially a low leading edge impingement flow design, the radial spacing for the leading edge impingement hole will be larger than the impingement jet can be spread out over the inner surface of the leading edge corner. This will induce a region with low impingement cooling area within the inner surface of the leading edge corner. This will yield a hot spot in-between the impingement hole and the uneven cooling for the blade leading edge impingement cooling cavity. Also, cross flow effect induced by the multiple hole impingement will lower the impingement heat transfer performance. An alternative way to provide an effective cooling at a low cooling flow design for the leading edge of the airfoil is the use of multiple compartmental cavities and backside impingement with a single impingement jet.

BRIEF SUMMARY OF THE INVENTION

It is therefore an object of the present invention to provide for a turbine airfoil with a leading edge impingement cooling using a low flow.

The present invention is a turbine airfoil, such as a rotor blade or a stator vane, with impingement cooling for the leading edge of the airfoil in which low cooling flow is used. FIG. 3 shows a turbine blade with the leading edge multiple impingement cooling circuit of the present invention. The blade still has the 3-pass aft flowing serpentine flow cooling circuit of the prior art blade. The leading edge flow channel is subdivided into multiple impingement cavities. Each impingement cavity is formed by a slanted rib with an impingement hole that will direct the cooling air to impinge on the backside of the blade leading edge inner wall for that cavity. The upper corner of the impingement cavity is formed by another slanted rib with an impingement hole that provides impingement cooling for the next cavity in the series. The cooling air for the leading edge is separate from the cooling air for the serpentine circuit for the remaining portions of the airfoil. The cooling air for the leading edge thus flows through a series of impingement cavities with impingement holes to produce a series of impingement cooling along the backside surface of the leading edge wall until the cooling air is discharged out the airfoil tip through tip exit cooling holes.

DETAILED DESCRIPTION OF THE INVENTION

Figure 1:
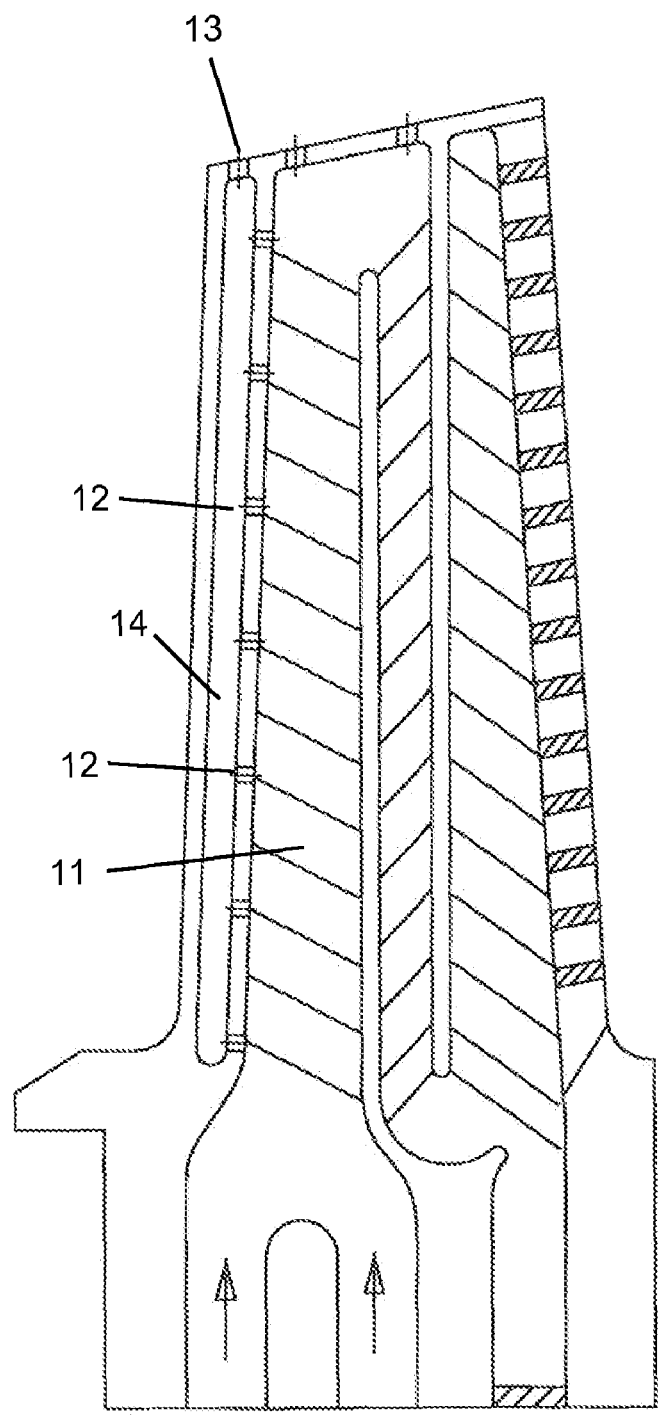
FIG. 1 shows cross section side view of a prior art turbine blade with leading edge impingement cooling.
Figure 2:
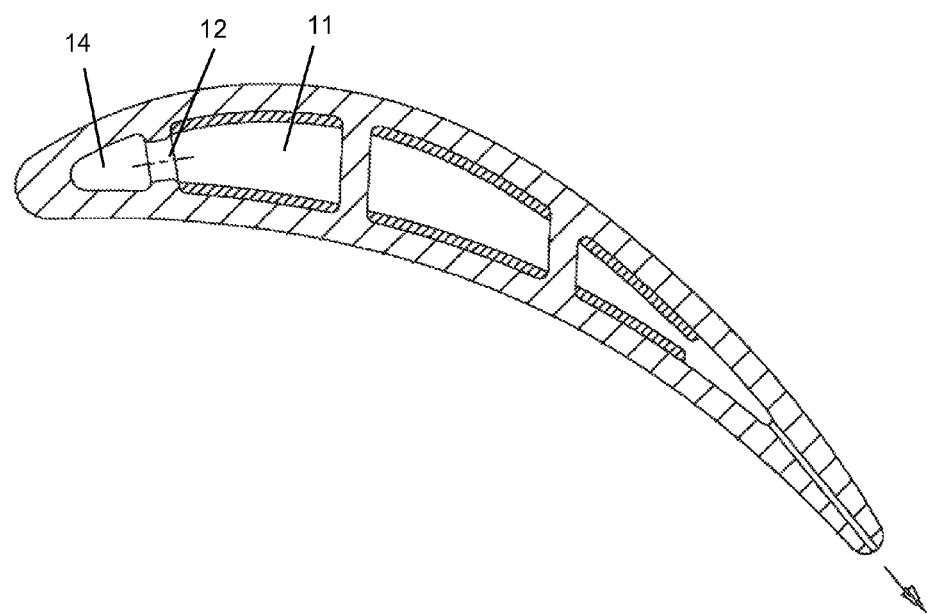
FIG. 2 shows a top view of a cross section taken through the blade of FIG. 1.
Figure 3:
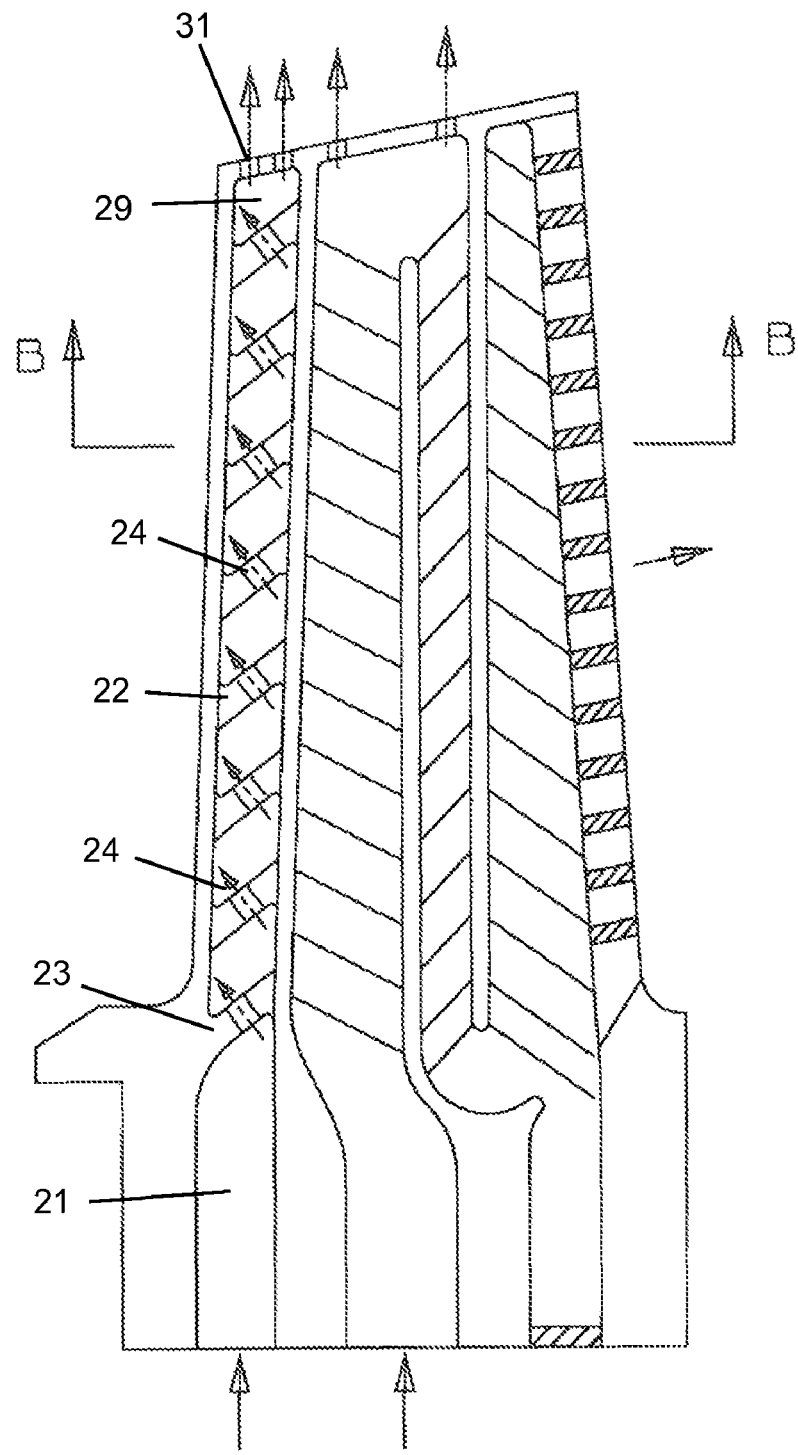
FIG. 3 shows a cross section side view of a turbine blade with the multiple impingement leading edge cooling circuit of the present invention.

The present invention is a turbine blade with a leading edge cooling circuit that makes us of a low flow and multiple impingement circuit to provide cooling for the leading edge while using a low cooling air flow. The present invention is shown in FIG. 3 which is a turbine blade having an aft flowing 3-pass serpentine flow cooling circuit along with trailing edge exit cooling holes to provide cooling for the mid-chord region and the trailing edge region of the blade. This is a standard mid-chord cooling circuit for the prior art. The present invention includes a series of impingement cavities formed along the leading edge region of the airfoil each with a slanted rib on the bottom side of the cavity with an impingement hole in the rib. The leading edge cooling supply channel 21 is separate from the serpentine flow circuit in the blade in order to allow for the low flow through the leading edge. An impingement cavity 22 is formed by a slanted rib 23 on the bottom of the cavity 22. an impingement hole 24 is formed within the slanted rib 23 to direct impingement cooling air against the backside wall of the leading edge in that cavity.

Figure 4:
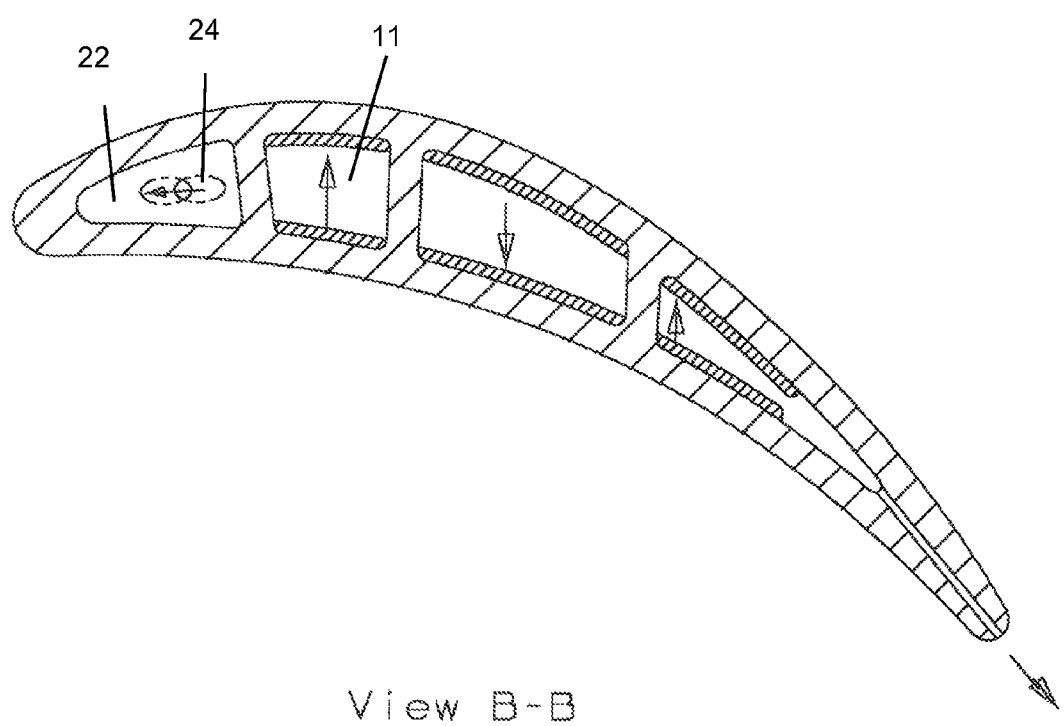
FIG. 4 shows a top view of a cross section taken through the blade of FIG. 3 of the present invention.

A series of cavities 22 is formed along the leading edge and separated from each other by the slanted ribs 23 each with an impingement hole formed therein 24 to direct impinging cooling air against the backside wall in that particular cavity. The last impingement cavity 29 located just underneath from the blade tip includes exit cooling holes 31 to discharge the impinging cooling air out to the tip. Because of the lack of any film cooling holes connected to the impingement cavities 22, all of the cooling air supplies into the first impingement cavity 22 will flow along the leading edge and out through the exit holes 31 at the tip. This also allows for the multiple impingement leading edge cooling circuit to allow for low cooling flow. FIG. 4 shows a top view through a section of the turbine blade in FIG. 3.

The multiple impingement cavities with impingement holes formed along the leading edge and the serpentine circuit for the remaining portion of the blade can all be cast at the same time. The entire blade interior cooling circuit can be cast using the well known casting processes such as investment casting. Also, trip strips or micro pin fins can be used on the inner walls of the impingement cavities on the pressure side and the suction side to enhance the heat transfer coefficient. Rotation of the blade in operation forces the cooling air through the series of impingement holes in the individual cavities due to the centrifugal force produced from the rotation. Thus, even with a drop off of pressure from the cooling air passing through the impingement holes, a high pressure is maintained due to the rotation of the blade.

The 3-pass serpentine cooling circuit that cools the mid-chord region is separate from the multiple impingement cavities along the leading edge in that the cooling air from one circuit does not mix with the other circuit within the airfoil. Also, the serpentine flow cooling circuit can be a 3-pass serpentine or a 5-pass serpentine, and it could be an aft flowing serpentine as shown or a forward flowing serpentine while still using the multiple impingement cavities and impingement cooling holes of the present invention.

Major advantages of the cooling circuit of the present invention over the prior art impingement cooling design is listed below. Individual impingement cooling cavity can be designed based on the airfoil local heat load and radial pressure profile by varying the pressure ratio across each impingement hole or impingement hole size. This translates to more effective use of cooling air and provides more uniform blade leading edge metal temperature. Multiple impingement compartmental cooling cavities utilize the same small amount of cooling air which yields a higher level of backside impingement heat transfer coefficient and cooler airfoil metal temperature than the prior art multiple impingement cooling design. In the prior art impingement cooling design with cooling supply channel, the supply channel bleeds off air and subsequently reduces the channel flow heat transfer coefficient. However, for the current multiple supply channels, it retains the same amount of cooling flow in each in individual supply channel and therefore provides a higher internal heat transfer coefficient than the prior art design. Multiple use of cooling air provides a higher overall cooling effectiveness level. The single impingement jet cooling with multiple cooling cavities eliminates the cross flow effect on impingement and achieves a much higher impingement heat transfer level for a given flow rate.

I claim the following:

1. An air cooled turbine airfoil comprising:
   a leading edge region;
   a plurality of impingement cavities formed along the leading edge region;
   each cavity being formed by a slanted rib;
   each slanted rib having an impingement hole formed therein to direct impinging cooling air to a backside surface of the wall in that particular impingement cavity; and,
   a pressurized cooling air supply channel to supply cooling air to the first impingement hole.

2. The air cooled turbine airfoil of claim 1, and further comprising:
   the turbine airfoil is a turbine blade.

3. The air cooled turbine airfoil of claim 1, and further comprising:
   the plurality of impingement cavities forms a separate cooling circuit from the remaining cooling circuit within the airfoil.

4. The air cooled turbine airfoil of claim 1, and further comprising:
   the top-most impingement cavity is formed under the airfoil tip; and,
   an exit cooling hole formed in the tip and connected to the top-most impingement cavity.

5. The air cooled turbine airfoil of claim 1, and further comprising:
   a serpentine flow cooling circuit formed in the airfoil aft of the impingement cavities, the leading edge impingement cavities and the serpentine flow cooling circuit being formed as separate cooling circuits within the airfoil.

6. The air cooled turbine airfoil of claim 1, and further comprising:
   the slanted ribs are slanted toward the leading edge wall; and,
   the impingement hole is directed to discharge impinging cooling air to the backside wall of the leading edge at about the mid-point of the wall in the spanwise direction of the airfoil.

7. An air cooled turbine blade comprising:
   an airfoil having a leading edge and a trailing edge and a pressure side wall and suction side wall extending between the two edges;
   a plurality of leading edge impingement cavities extending along the leading edge of the airfoil, each impingement cavity including a slanted rib on the lower side with an impingement hole formed therein and directed to discharge impinging cooling air against the backside wall of the leading edge surface associated with that impingement cavity;
   an exit cooling hole connecting the top-most impingement cavity to the blade tip; and,
   a serpentine flow cooling circuit located aft of the leading edge impingement cavities.

8. The air cooled turbine blade of claim 7, and further comprising:
   the slanted ribs are slanted toward the leading edge wall; and,
   the impingement holes is directed to discharge impinging cooling air to the backside wall of the leading edge at about the mid-point of the wall in the spanwise direction of the airfoil.

9. The air cooled turbine blade of claim 7, and further comprising:

the serpentine circuit and the plurality of leading edge impingement cavities form a separate cooling circuits within the airfoil.

10. A process for cooling a leading edge of an air cooled turbine blade comprising the steps of:

supplying a pressurized cooling air to the root of the blade;

passing the cooling air along the leading edge in a series of impingement holes and impingement cavities to cool the backside wall of the leading edge;

directing the impingement cooling air in a slanted direction upward toward a tip of the blade; and, discharging the cooling air from the top-most impingement cavity through an exit hole in the tip of the blade.

11. The process for cooling a leading edge of an air cooled turbine blade of claim 10, and further comprising the step of:

passing cooling air through a serpentine circuit within the airfoil aft of the leading and separate from the edge impingement cooling circuit within the airfoil.

12. The process for cooling a leading edge of an air cooled turbine blade of claim 10, and further comprising the step of:

discharging the impinging cooling air onto the backside wall of the airfoil at a location about at mid-point along the wall in the airfoil spanwise direction.

* * * * *